United States Patent
Mazanek et al.

(10) Patent No.: US 6,739,555 B2
(45) Date of Patent: May 25, 2004

(54) REUSABLE MODULE FOR THE STORAGE, TRANSPORTATION, AND SUPPLY OF MULTIPLE PROPELLANTS IN A SPACE ENVIRONMENT

(75) Inventors: Daniel D. Mazanek, Yorktown, VA (US); John C. Mankins, Ashburn, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/214,481

(22) Filed: Aug. 2, 2002

(65) Prior Publication Data

US 2003/0025037 A1 Feb. 6, 2003

Related U.S. Application Data

(60) Provisional application No. 60/309,977, filed on Aug. 3, 2001.

(51) Int. Cl.[7] .................................................. B64G 1/00
(52) U.S. Cl. .................................... 244/158 R; 244/172
(58) Field of Search .......................... 244/158 R, 172, 244/135 R, 117 R

(56) References Cited

U.S. PATENT DOCUMENTS

| | | | |
|---|---|---|---|
| 4,471,926 A | 9/1984 | Steel, III | 244/158 R |
| 4,609,169 A | 9/1986 | Schweikert et al. | 244/169 |
| 4,664,343 A | 5/1987 | Lofts et al. | 244/158 R |
| 4,896,848 A | 1/1990 | Ballard et al. | 244/158 R |
| 5,092,545 A | 3/1992 | Butterfield et al. | 244/158 R |
| 5,263,666 A * | 11/1993 | Hubert et al. | 244/172 |
| 5,595,360 A | 1/1997 | Spitzer | 244/158 R |
| 5,816,539 A | 10/1998 | Chan et al. | 244/172 |
| 5,961,076 A | 10/1999 | Eller et al. | 244/158 R |
| 6,113,032 A * | 9/2000 | Cochran et al. | 244/135 R |
| 6,488,237 B1 * | 12/2002 | Glasser et al. | 244/172 |
| 2003/0019977 A1 * | 1/2003 | Fisher et al. | 244/172 |
| 2003/0029969 A1 * | 2/2003 | Turner | 244/158 R |

OTHER PUBLICATIONS (UNKNOWN), "NASA Developing Telerobotic System to Automate Assembly in Space," Aviation Week & Space Technology, vol. 133 (No. 10), p. 197, (Sep. 3, 1990).

(UNKNOWN), "Darpa To Demonstrate New Satellite Concept," Aviation Week & Space Technology, vol. 151 (No. 23), pp. 30–31, (Dec. 6, 1999).

Graf, Gary R., "Write of Passage," Ad Astra, pp. 5–6, (Oct. 1, 1989).

(UNKNOWN), "NASA Robot to Have Private–Sector Spinoffs," High Technology Business, p. 37, (Mar. 1, 1989).

Foley, Theresa M., "SDIO Plans Robotic System to Service Weapons in Space," Aviation Week & Space Technology, No. 128, pp. 45–46, (Feb. 22, 1988).

(UNKNOWN), "NASA Selects Contractors to Design Robotic Satellite Servicer," Aviation Week & Space Technology, No. 132, p. 28, (Jun. 11, 1990).

(List continued on next page.)

Primary Examiner—J. Woodrow Eldred
(74) Attorney, Agent, or Firm—Kurt G. Hammerle

(57) ABSTRACT

A space module has an outer structure designed for traveling in space, a docking mechanism for facilitating a docking operation therewith in space, a first storage system storing a first propellant that burns as a result of a chemical reaction therein, a second storage system storing a second propellant that burns as a result of electrical energy being added thereto, and a bi-directional transfer interface coupled to each of the first and second storage systems to transfer the first and second propellants into and out thereof. The space module can be part of a propellant supply architecture that includes at least two of the space modules placed in an orbit in space.

36 Claims, 3 Drawing Sheets

OTHER PUBLICATIONS

Newman, Laurie Kraft, "Economic Feasibility of Satellite Refueling Using a Low–Cost Servicer," MS Thesis, University of Maryland (College Park, MD), (Apr. 25, 1994).

Hendrick, Richard T., "On–Orbit Servicing: The Time for a New Era in Space Logistics," Logistics Spectrum, vol. 31 (No. 6), pp. 12–14, (Nov. 1, 1997).

Bahr, Nicholas J., "Developing a Safe On–Orbit Cryogenic Depot," The Second Conference on Lunar Bases and Space Activities of the 21st Century, No. 1, pp. 95–100, (Sep. 1, 1992).

Chato, David J., "Technologies for Refueling Spacecraft On–Orbit," NASA Technical Memorandum 2002–210476, NASA, (Nov. 1, 2000).

Flemming, Ken, "STV Fueling Options," Beyond the Baseline 1991: Proceedings of the Space Station Evolution Symposium, pp. 489–531, (Sep. 1, 1991).

Kaszubowski, Martin J. and Ayers, J. Kirk, "The Transportation Depot–An Orbiting Vehicle Support Facility," The Second Conference on Lunar Bases and Space Activities of the 21st Century, No. 1, pp. 83–93 (Sep. 1, 1992).

Stubbs, R.M., "Technology Requirements for an Orbiting Fuel Depot—A Necessary Element of a Space Infrastructure," NASA Technical Memorandum 101370, NASA, (Oct. 8, 1988).

* cited by examiner

REUSABLE MODULE FOR THE STORAGE, TRANSPORTATION, AND SUPPLY OF MULTIPLE PROPELLANTS IN A SPACE ENVIRONMENT

Pursuant to 35 U.S.C. §119, the benefit of priority from provisional application 60/309,977, with a filing date of Aug. 3, 2001, is claimed for this non-provisional application.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to the storage, transportation, and supply of propellants in space. More specifically, the invention is a reusable space module that can warehouse, transport, and supply high-thrust propellant(s) needed for time critical space travel and low-thrust propellant(s) usable for non-time critical space travel.

2. Description of the Related Art

Many engineering problems must be solved in order to provide safe, affordable, and efficient in-space transportation of both personnel and equipment. These challenges directly impact the commercialization of space. In particular, cost is the single largest obstacle. One method of reducing costs is to develop reusable transportation systems for both Earth-to-orbit systems and in-space systems. Without reusable systems, sustained exploration or large-scale development beyond Low Earth Orbit (LEO) using in-space transportation systems will not be economically feasible.

Significant challenges must be overcome for in-space transportation to become a reality. For example, reusable in-space transportation systems that are affordable must provide good fuel efficiency, be capable of mass production, and be compatible across a broad spectrum of applications. Another significant challenge involves how to minimize the in-space travel time for manned missions. The risk associated with human missions can be significantly reduced by decreasing the time that the crew is in transit.

Currently, the primary propulsion method for manned and unmanned missions utilizes chemical propulsion systems. This trend is expected to continue for the foreseeable future. While nuclear thermal propulsion systems show promise as part of a highly efficient transportation system of the future, the major drawback of a nuclear thermal propulsion system is the inherent public concerns that accompany the use of these systems near the Earth. The chemical propulsion system provides a reasonably high thrust thereby making it a logical choice for time critical space travel. However, one significant drawback to chemical systems is the relatively low specific impulse of this form of propulsion. That is, chemical propulsion systems require large propellant quantities to provide the velocity changes needed to complete a mission. The need for a large amount of propellant translates into a larger, heavier space vehicle which, by itself, exacerbates the need for even more propellant. As a result, chemical propellant-based space vehicles are large and expensive.

SUMMARY OF THE INVENTION

In accordance with the present invention, a space module has an outer structure designed for traveling in space. At least one docking mechanism is coupled to an end of the outer structure for facilitating a docking operation therewith in space. A first storage system mounted within the outer structure stores a first propellant that burns as a result of a chemical reaction therein. A second storage system mounted within the outer structure stores a second propellant that burns as a result of electrical energy being added thereto. A bi-directional transfer interface is coupled to each of the first and second storage systems to transfer the first and second propellants into and out thereof.

The space module can be part of a propellant supply architecture that is used for in-space transportation. In this architecture, at least two of the space modules are transported to an orbit in space. A first of the space modules is coupled to a first space vehicle via its docking mechanism. The first space vehicle travels to a location in space using the first propellant (e.g., high thrust propellant when the first space vehicle is a manned vehicle) to generate thrust. A second of the space modules is coupled to a second space vehicle via its docking mechanism. The second space vehicle travels to the same location in space as the first space vehicle, but uses the second propellant (e.g., low thrust propellant when the second space vehicle is an unmanned vehicle) to generate thrust. When it is time for the first (manned) space vehicle to return, the first and second space vehicles swap space modules thereby providing i) a full supply of first propellant for the first space vehicle's return trip, and ii) a full supply of second propellant for the second space vehicle's return trip.

DETAILED DESCRIPTION OF THE INVENTION

Figure 1:
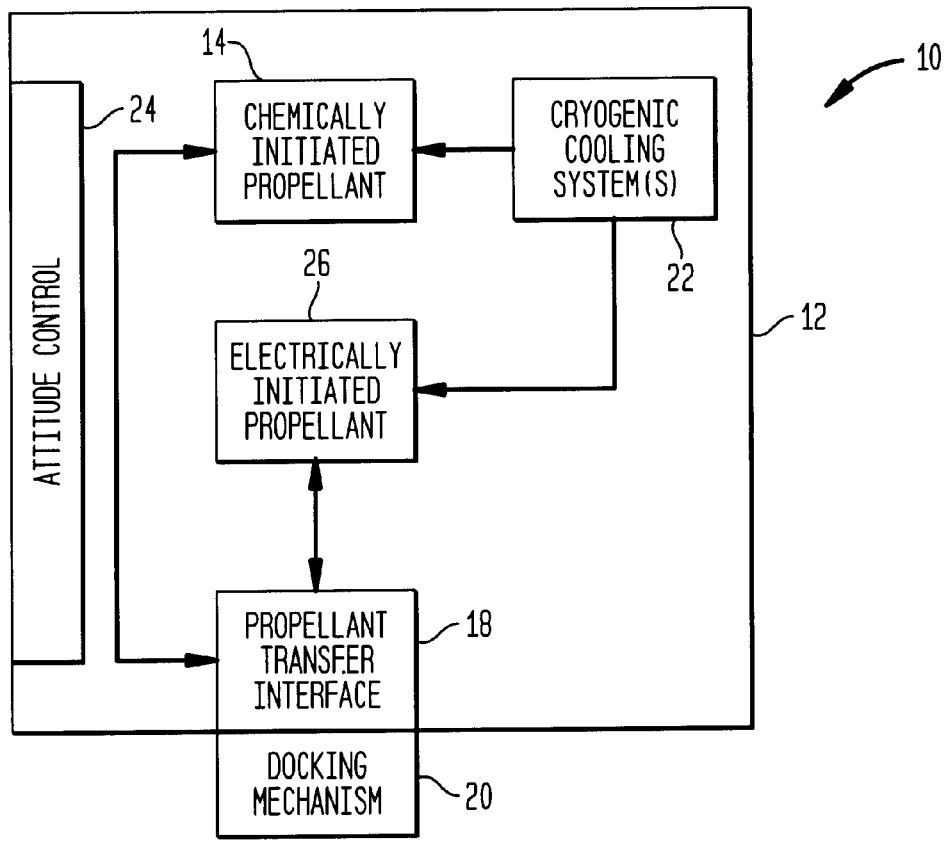
FIG. 1 is a top-level diagram of a reusable space module for the storage, transportation, and supply of multiple propellants in accordance with the present invention.

Referring now to the drawings, and more particularly to FIG. 1, a top-level diagram of a space module for the storage, transportation, and supply of multiple propellants is shown and referenced generally by numeral 10. In general, space module 10 is a facility that combines propellant storage and supply in an in-space structural package that can be coupled to and used by space vehicles as their propellant supply during in-space travel.

Because the present invention is not intended to be limited by a specific configuration or use in a specific in-space propellant storage/supply architecture, space module 10 will be described relative to its general inventive features. Then, by way of illustrative example, a more specific embodiment of the space module will be described in which transportation to space and deployment thereof in space is accomplished with a Shuttle-class reusable launch vehicle (RLV). Finally, an in-space propellant supply architecture will be described in which multiple space modules are used to supply propellant for an in-space mission.

Space module 10 has an outer structure 12 constructed for in-space travel and the protection of the contents thereof from hazards of the space environment such as debris, excessive heat and/or radiation, etc. At a minimum, the contents of structure 12 include a store 14 of chemically initiated propellant, a store 16 of electrically initiated propellant, and a bi-directional propellant transfer interface 18. At one end of structure 12 is a docking mechanism 20 to which a visiting module (e.g., space vehicle, satellite requiring refueling, or other in-space facility) can be mechanically coupled. Additional docking mechanisms can be provided on outer structure 12 as will be described later below. To facilitate the transfer of propellant both to and from each of stores 14 and 16, transfer interface 18 is accessed at docking mechanism 20. In general, transfer interface 18 provides individualized and standardized connections for the chemically and electrically initiated propellants in stores 14 and 16, respectively.

As used herein and as is well known in the art, a chemically initiated propellant is any liquid-form mono or bipropellant, solid propellant, or combination of liquid and solid propellant that burns as a result of a chemical reaction therein. Such chemically initiated propellants (e.g., liquid hydrogen/oxygen, hydrazine, kerosene, etc.) generally provide high thrust at the expense of a low specific impulse which is a measure of efficiency. Thus, chemically initiated propellants are preferred for use in space travel that is time critical as is the case for manned space missions. In contrast, electrically initiated propellants generally produce low thrust, but have a high specific impulse or efficiency. Thus, electrically initiated propellants could be used in space travel that is not time critical, e.g., ferrying of equipment, unmanned space missions, transportation of the chemically initiated propellant, etc. As used herein and as is well known in the art, electrically initiated propellants require the addition of electric energy (e.g., spark discharge, propellant ionization, solid resistive elements in the propellant, etc.) to initiate the burning thereof.

Figure 2:
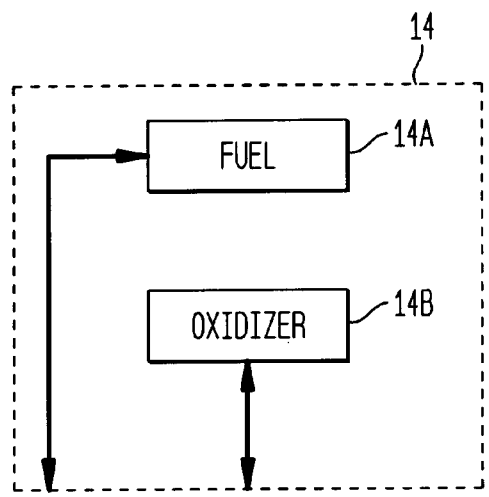
FIG. 2 is a block diagram illustrating separate storage tanks for storage of a chemically initiated propellant's fuel and oxidizer.

A well known example of chemically initiated propellants is a liquid bipropellant having a fuel (e.g., liquid hydrogen) and an oxidizer (e.g., liquid oxygen) maintained in different storage systems until the burning thereof is desired. Accordingly, in such instances, store 14 provides a tank 14A for the fuel and a separate tank 14B for the oxidizer as illustrated in FIG. 2. Each of tanks 14A and 14B would be constructed as needed to safely store the contents thereof until they are to be supplied via transfer interface 18. For long-term, in-space storage, it may be necessary to cryogenically cool the liquid fuel and oxidizer to maximize their densities and prevent their boil off during prolonged periods of time. Accordingly, one or more cryogenic cooling system(s) 22 may be provided onboard outer structure 12. Cryogenic cooling system(s) 22 can be used to cool any of the propellants in store 14.

The electrically initiated propellant in store 16 can be any low thrust, high specific impulse propellant such as xenon, krypton, argon, helium, and even hydrogen. However, for current state-of-the-art electric propulsion systems, xenon and krypton are usually used because they provide sufficiently high thrust levels. If desired, the propellant can be cooled by cryogenic cooling system(s) 22. For example, the cryogenic cooling of xenon will keep it in its higher density liquid state which means that a greater amount of the propellant can be stored in a given volume than if it were maintained in its gaseous state.

As will be explained further below, one use of space module 10 involves the deployment thereof by itself in an orbit where a visiting vehicle can be docked thereto via docking mechanism 20. In this use, since space module 10 must be able to maintain its proper orientation in orbit and/or position itself for a docking operation, an attitude control 24 is coupled to outer structure 12. Attitude control 24 can be realize by any of a variety of reaction-based (e.g., thrusters) designs or momentum exchange devices (e.g., control moment gyros, flywheels, etc.) Thus, the particular choice of attitude control 24 is not a limitation of the present invention.

Space module 10 could also incorporate other devices/systems to support its functions. For example, power for space module 10 could be beamed thereto via space or collected by solar photovoltaic arrays (not shown) extending out therefrom. Storage of such power could be achieved using batteries. Another option for power storage is to use flywheels if attitude control 24 is a flywheel-based system. Another device/system not illustrated for sake of clarity is the plumbing and management system used to couple the contents of each of stores 14 and 16 to transfer interface 18. Other devices/systems that would typically be included onboard space module 10 include communications systems, navigation systems which would be coupled to attitude control 24, and other sensors/computers typically found onboard spacecraft.

Figure 3:
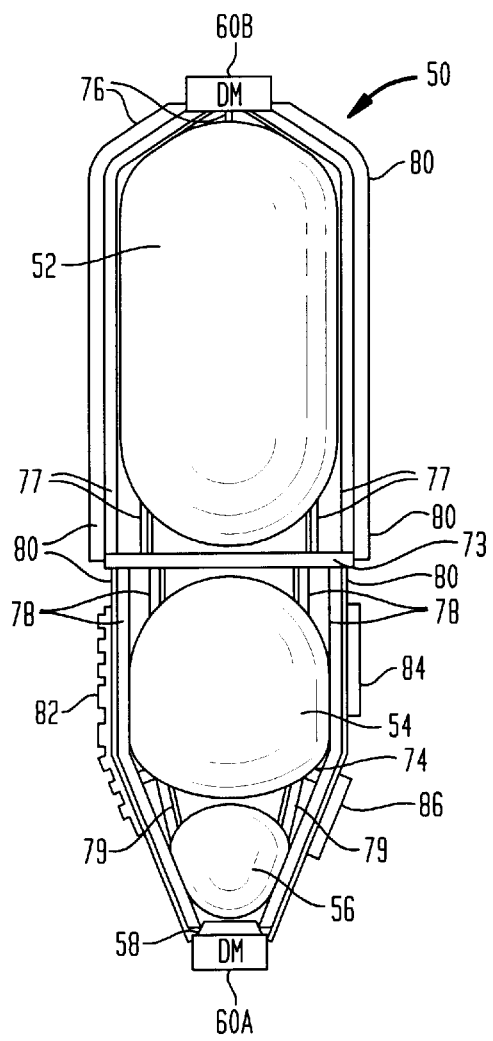
FIG. 3 is a schematic view of one embodiment of the space module configured for transportation and deployment in space by means of a shuttle-class reusable launch vehicle, and configured to withstand translational loading imported by a space vehicle(s) coupled thereto.

Referring now to FIG. 3, a more specific embodiment of the present invention's space module 10 is shown and is illustrated generally by numeral 50. Space module 50 is sized and constructed for transport in and deployment from the cargo bay of a Shuttle-class RLV, and is further constructed to maintain its structural integrity when coupled to space vehicles that impact axial and translational loads transferred to space module 50 during space travel. In addition, space module 50 has docking mechanisms 60A and 60B provided at opposing longitudinal ends thereof. In this way, a space vehicle (i.e., with engines) could be coupled to docking mechanism 60A (where propellant transfer interface 58 terminates) while a payload (e.g., crew compartment, equipment, another one of space modules 50, etc.) could be coupled to docking mechanism 60B. For these reasons, the primary structure of space module 50 must be strong enough to support and protect its contents and provide a load transfer path for modules/vehicles coupled thereto.

Figure 4:
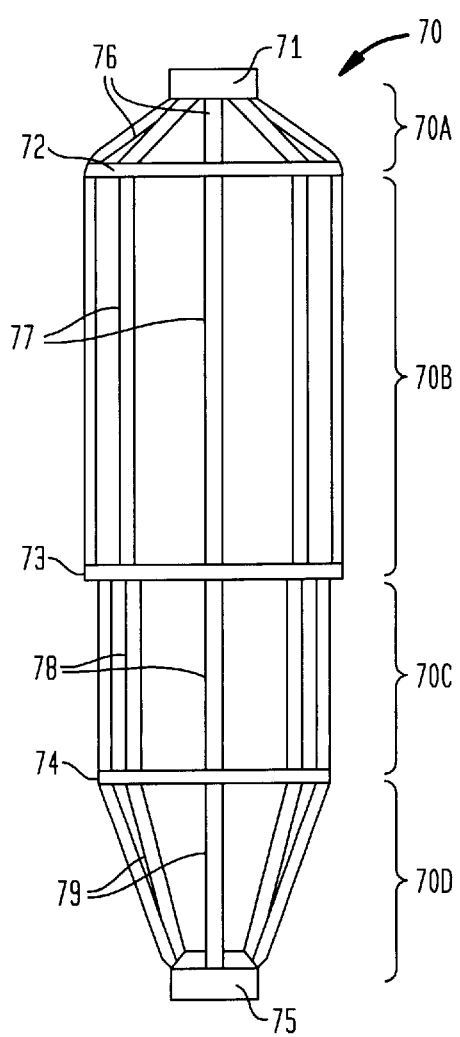
FIG. 4 is an isolated side view of the frame of the outer structure for the space module illustrated in FIG. 3.

As shown in FIG. 4, the primary or skeletal frame of space module 50 is referenced generally by numeral 70. Frame 70 defines two main cylindrical sections 70B and 70C and two tapered sections 70A and 70D disposed at opposing longitudinal ends of frame 70. In general, each of these sections begins and ends with ring-shaped beams which are structurally coupled to one another by longerons (e.g., I-beams). More specifically, upper tapered frame section 70A has a docking ring 71 (to which docking mechanism (DM) 60B is coupled) and an end ring 72 coupled together by longerons 76. Main section 70B has end ring 72 and a mid-span ring 73 coupled together by longerons 77. Main section 70C has mid-span ring 73 and an end ring 74 coupled together by longerons 78. Lower tapered section 70D has end ring 74 and a docking ring 75 (to which docking mechanism (DM) 60A is coupled) coupled together by longerons 79. The longerons that span each section define the main axial load carrying structure. Therefore, the longerons are typically made from a very rigid material such as a magnesium metal matrix having long fiber carbon embedded therein, although it is to be understood that the choice of material is not a limitation of the present invention. Each of rings 71–75 can also be made from the same rigid material. Note that mid-span ring 73 can also serve as a connection point for trunion fittings (not shown) used by a Shuttle-class RLV. The tapering of each of sections 70A and 70D to the dimensions of docking rings 71 and 75, respectively, improves axial and translational load transfer from vehicles/modules docked to space module 50.

Referring again to FIG. 3, a skin 80 is operatively connected to frame 70 to protect the contents of space module 50. Because space module 50 will be relatively "parked" in orbits such as Low Earth Orbit, it will be subject to impact from micrometeriods and other forms of orbital space debris. Thus, skin 80 forms a shield that is generally a multi-layer structure that can be impacted without permitting an impacting projectile pass therethrough. Some of the layers could be selected to provide thermal protection if necessary. One example of skin 80 has layers of ceramic cloth interleaved with low density open-cell foam, all of which is supported on a multi-layer strength material (e.g., KEVLAR) wall that is attached directly to the longerons of frame 70. Another example of skin 80 is the well-known Whipple debris shield with thermal insulation incorporated therein. Skin 80 could also be made from combinations of these or other technologies. Accordingly, it is to be understood that the particular choice of skin 80 is not a limitation of the present invention.

The diameter of section 70C is made slightly smaller than that of section 70B in order to accommodate various stand-off devices/systems used to support space module 50. By way of non-limiting examples, such support devices/systems may include radiator(s) 82, photovoltaic array(s) 84 which are collapsed against skin 80 during transport and would typically extend out from space module 50 when it is deployed in orbit, and panel(s) 86 for accessing computers, data recorders, and communications hardware (not shown for clarity of illustration) maintained onboard space module 50.

Space module 50 is illustrated with three storage tanks for storing liquid hydrogen fuel, liquid oxygen oxidizer, and liquid xenon. Specifically, tank 52 stores liquid hydrogen, tank 54 stores liquid oxygen, and tank 56 stores liquid xenon. Although not illustrated in FIG. 3 for sake of clarity, each of tanks 52, 54, and 56 would be coupled to a cryogenic cooling system (e.g., cryogenic cooling system 22) in order to prevent boil-off during long periods of storage. Also not illustrated for sake of clarity are the attitude control system and any plumbing system used to couple each of tanks 52, 54, and 56 to transfer interface 58. Because the density of liquid oxygen and liquid xenon is considerably greater than that of liquid hydrogen, tanks 54 and 56 are positioned closer to transfer interface 58 than tank 52. This positioning scheme places the center of gravity of space module 50 as close as possible to the space vehicle (not shown) that will be coupled to docking mechanism 60A and that will be burning one of the liquid hydrogen/liquid oxygen or liquid xenon propellants.

In operation, the space module of the present invention is filled with each of its propellants by means of its bi-directional propellant transfer interface (e.g., interface 18 or 58) and then deployed in space by means of either a launch vehicle (e.g., reusable or expendable) coupled to the module that uses one of its propellant stores, or by means of an RLV (or an expendable launch vehicle) that ferries the fully-loaded space module as a piece of cargo. It is to be understood that, depending on the particular application, the space module could be partially filled with one or more of its propellants. Further, other applications may exist in which the space module is deployed in an empty state, i.e., no propellants. Regardless of the amount of propellant stored or type of deployment vehicle used, once the space module is deployed in an orbit, its onboard attitude control (e.g., attitude control 24) maintains the proper attitude of the space module for docking. Onboard position determination systems (e.g., a GPS-based system) may be used to position the space module (using its attitude control) for docking with a space vehicle. Once coupled to a space vehicle, one of the chemically initiated or electrically initiated propellants is supplied to the space vehicle via the space module's transfer interface 18. Individual units of the space module 10 could be used to re-supply propellant to geostationary satellites or space stations. They could also be used to supply both types of propellant for one-way mission vehicles. They further could be used as propellant depots to which small space vehicles come to re-fuel.

Figure 5:
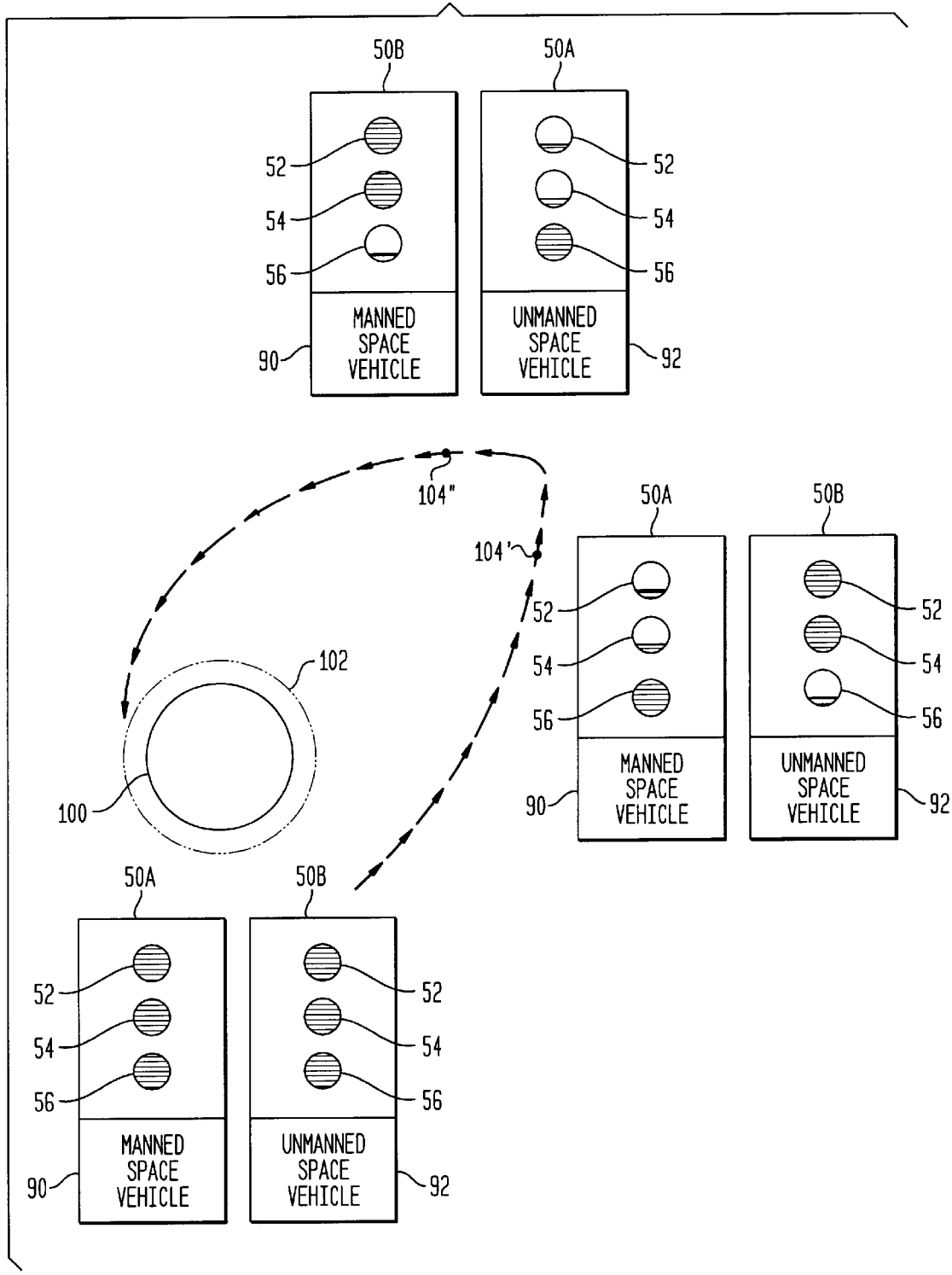
FIG. 5 depicts a space transportation scenario utilizing a propellant supply architecture based on the space module of the present invention.

In addition to its stand alone utility, the space module 10 of the present invention can be used as an integral element of an in-space propellant supply architecture, one example of which is illustrated in FIG. 5. Two fully loaded space modules 50A and 50B (each of which is similar to space module 50) are deployed about the Earth 100 in a Low Earth Orbit 102. The fully loaded nature of the space modules is indicated in FIG. 5 by tanks 52, 54, and 56 being fully cross-hatched. The space modules 50A, 50B could also be initially stationed at various locations in space other than Low Earth Orbit 102. Accordingly, it is to be understood that the particular choice of deployment location is not a limitation of the present invention.

A manned space vehicle 90 is coupled to space module 50A and an unmanned space vehicle 92 is coupled to space module 50B. Manned space vehicle 90 uses the high thrust, chemically initiated propellant in tanks 52, 54 in order to propel itself toward an outer space destination as quickly as possible. For example, when space vehicle 90 reaches a destination 104', the fuel and oxidizer in tanks 52 and 54, respectively, are substantially depleted as indicated by the reduced cross-hatched portion thereof at destination 104'. However, note that the electrically initiated propellant in tank 56 is still at full capacity. In contrast, unmanned space vehicle 92 uses the low thrust, electrically initiated propellant in tank 56 in order to propel itself toward approximately the same destination as space vehicle 90. Thus, when space vehicle 92 reaches destination 104', the propellant in tank 56 is substantially depleted as indicated by the reduced cross-hatched portion thereof at destination 104'. However, the chemically initiated propellants in tanks 52 and 54 are still at full capacity. Accordingly, when it is time for manned space vehicle 90 to return to orbit 102, space module 50A is released from space vehicle 90, and space module 50B is released from space vehicle 92. Then, space vehicle 90 re-docks to space module 50B (which is fully loaded with chemically-initiated propellant), and space vehicle 92 re-docks with space module 50A (which is fully loaded with electrically initiated propellant). The switching of space modules between space vehicles typically occurs in the vicinity of original destination 104'. For purpose of illustration, the switching of space modules/vehicles is complete at a destination 104" which is generally going to be in the vicinity of destination 104'. Manned space vehicle 90 can then quickly return to orbit 102 using the high thrust provided by the full load of chemically initiated propellant onboard space module 50B, while space vehicle 92 returns at a slower pace using the full load of electrically initiated propellant onboard space module 50A.

The above-described, in-space propellant supply architecture can save a significant amount of chemically initiated propellant when compared to a manned space vehicle that must be configured with enough propellant to get its crew to a destination in space and then return its crew from the destination in space, primarily because there is a substantial mass penalty for carrying enough propellant to support transport for a round trip. In contrast, the propellant supply architecture of the present invention can utilize smaller space modules because the high thrust propellant is designed for a one-way trip.

The space module 10 provides a reusable means of providing propellant for in-space operations such as re-fueling of orbiting vehicles, providing manned and unmanned space vehicles with both high thrust and low thrust propellant supplies, and warehousing of propellants for long periods of time. Each space module can be re-filled with each type of propellant at a depot maintained, for example, in a Low Earth Orbit. Use of the space module in a propellant supply architecture as described herein will greatly reduce the mass penalty associated with existing manned space travel that use chemically initiated propellants.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed as new and desired to be secured by Letters Patent of the United States is:

1. A space module, comprising:
    an outer structure for traveling in space;
    at least one docking mechanism coupled to an end of said outer structure for facilitating a docking operation therewith in space;
    a first storage system mounted within said outer structure for storing a first propellant that burns as a result of a chemical reaction therein;
    a second storage system mounted within said outer structure for storing a second propellant that burns as a result of electrical energy being added thereto; and
    a bi-directional transfer interface coupled to said first storage system for transferring said first propellant into and out thereof, said bi-directional transfer interface further coupled to said second storage system for transferring said second propellant into and out thereof.

2. A space module as in claim 1 wherein said at least one docking mechanism comprises:
    a first docking mechanism positioned at one longitudinal end of said outer structure; and
    a second docking mechanism positioned at an opposing longitudinal end of said outer structure.

3. A space module as in claim 1 wherein said first propellant comprises a fuel and an oxidizer, and wherein said first storage system includes a first tank for storing said fuel and a second tank for storing said oxidizer.

4. A space module as in claim 3 wherein each of said fuel and said oxidizer are stored in a liquid form.

5. A space module as in claim 4 wherein said fuel is liquid hydrogen and said oxidizer is liquid oxygen.

6. A space module as in claim 1 wherein said second propellant is selected from the group consisting of xenon and krypton.

7. A space module as in claim 2 wherein said bi-directional transfer interface terminates at one of said first and second docking mechanisms wherein, when a visiting module is coupled to said one of said first and second docking mechanisms, each of said first propellant and said second propellant can be transferred to and from the visiting module via said bi-directional transfer interface.

8. A space module as in claim 1 further comprising means coupled to said outer structure for controlling attitude of said outer structure while traveling in space.

9. A space module as in claim 3 wherein said second storage system includes a third tank for storing said second propellant, and wherein said first tank, said second tank, and said third tank are aligned along a longitudinal axis of said outer structure.

10. A space module as in claim 1 further comprising means coupled to said first storage system and said second storage system for cryogenically cooling said first propellant and said second propellant.

11. A space module as in claim 1 wherein said outer structure comprises:
    a skeletal frame; and
    a skin coupled to and covering said skeletal frame, said skin including means for deflecting space debris impacting said skin.

12. A space module as in claim 11 wherein said skeletal frame comprises:
    a plurality of rings spaced apart from one another along a longitudinal axis of said outer structure; and
    a plurality of longerons coupled between and to each pair of adjacent ones of said plurality of rings.

13. A space module for transport to an orbit in space in the cargo bay of a launch vehicle and for deployment in the orbit by the launch vehicle, said space module comprising:
    an outer structure that is generally cylindrical and tapers at opposing longitudinal ends thereof;
    a first docking mechanism positioned at one of said longitudinal ends of said outer structure;
    a second docking mechanism positioned at an opposing one of said longitudinal ends of said outer structure;
    a first storage system mounted within said outer structure for storing a first propellant that burns as a result of a chemical reaction therein;
    a second storage system mounted within said outer structure for storing a second propellant that burns as a result of electrical energy being added thereto; and
    a bi-directional transfer interface coupled to said first storage system for transferring said first propellant into and out thereof, said bi-directional transfer interface further coupled to said second storage system for transferring said second propellant into and out thereof, said bi-directional transfer interface terminating at one of said first and second docking mechanisms wherein, when a visiting module is coupled to said one of said first and second docking mechanisms, each of said first propellant and said second propellant can be transferred to and from the visiting module via said bi-directional transfer interface.

14. A space module as in claim 13 wherein said first propellant comprises a fuel and an oxidizer, and wherein said first storage system includes a first tank for storing said fuel and a second tank for storing said oxidizer.

15. A space module as in claim 14 wherein each of said fuel and said oxidizer are stored in a liquid form.

16. A space module as in claim 15 wherein said fuel is liquid hydrogen and said oxidizer is liquid oxygen.

17. A space module as in claim 16 wherein said second propellant is selected from the group consisting of xenon and krypton.

18. A space module as in claim 17 wherein said second storage system includes a third tank for storing said second propellant, and wherein said first tank, said second tank, and said third tank are aligned sequentially along a longitudinal axis of said outer structure with said third tank being closest to said one of said first and second docking mechanisms at which said bi-directional transfer interface terminates, said second tank being positioned between said first tank and said third tank.

19. A space module as in claim 13 further comprising means coupled to said outer structure for controlling attitude of said outer structure after deployment thereof in the orbit by the launch vehicle.

20. A space module as in claim 13 further comprising means coupled to said first storage system and said second storage system for cryogenically cooling said first propellant and said second propellant.

21. A space module as in claim 13 wherein said outer structure comprises:
a skeletal frame; and
a skin coupled to and covering said skeletal frame, said skin including means for deflecting space debris impacting said skin.

22. A space module as in claim 21 wherein said skeletal frame comprises:
a plurality of rings spaced apart from one another along a longitudinal axis of said outer structure, said plurality of rings including i) a first ring to which said first docking mechanism is coupled, ii) a second ring to which said second docking mechanism is coupled, and iii) at least one additional ring positioned between said first ring and said second ring; and
a plurality of longerons coupled between and to each pair of adjacent ones of said plurality of rings.

23. A propellant supply architecture for in-space transportation comprising:
at least two space modules with each of said space modules being transported to an orbit in space in the cargo bay of a launch vehicle and deployed in the orbit by the launch vehicle;
each of said space modules comprising
i) an outer structure,
ii) a first docking mechanism positioned at a first longitudinal end of said outer structure,
iii) a second docking mechanism positioned at a second longitudinal end of said outer structure,
iv) a first storage system mounted within said outer structure for storing a first propellant that burns as a result of a chemical reaction therein,
v) a second storage system mounted within said outer structure for storing a second propellant that burns as a result of electrical energy being added thereto, and
vi) a bi-directional transfer interface coupled to said first storage system for transferring said first propellant into and out thereof, said bi-directional transfer interface further coupled to said second storage system for transferring said second propellant into and out thereof, said bi-directional transfer interface terminating at one of said first and second docking mechanisms wherein, when a space vehicle is coupled to said one of said first and second docking mechanisms, each of said first propellant and said second propellant can be transferred to and from the space vehicle via said bi-directional transfer interface;
wherein a first of said space modules is coupled toward a first space vehicle via said one of said first and second docking mechanisms associated with said first of said space modules, and wherein the first space vehicle travels toward a destination in space using said first propellant to generate thrust; and
wherein a second of said space modules is coupled to a second space vehicle via said one of said first and second docking mechanisms associated with said second of said space modules, and wherein the second space vehicle travels toward said destination in space using said second propellant to generate thrust.

24. A propellant supply architecture as in claim 23 wherein, for each of said space modules, said first propellant comprises a fuel and an oxidizer, and wherein said first storage system includes a first tank for storing said fuel and a second tank for storing said oxidizer.

25. A propellant supply architecture as in claim 24 wherein, for each of said space modules, each of said fuel and said oxidizer are stored in a liquid form.

26. A propellant supply architecture as in claim 25 wherein, for each of said space modules, said fuel is liquid hydrogen and said oxidizer is liquid oxygen.

27. A propellant supply architecture as in claim 26 wherein, for each of said space modules, said second propellant is selected from the group consisting of xenon and krypton.

28. A propellant supply architecture as in claim 27 wherein, for each of said space modules, said second storage system includes a third tank for storing said second propellant, and wherein said first tank, said second tank, and said third tank are aligned sequentially along a longitudinal axis of said outer structure with said third tank being closest to said one of said first and second docking mechanisms at which said bi-directional transfer interface terminates, said second tank being positioned between said first tank and said third tank.

29. A propellant supply architecture as in claim 23 wherein each of said space modules further comprises means coupled to said outer structure for controlling attitude of said outer structure after deployment thereof in the orbit by the launch vehicle.

30. A propellant supply architecture as in claim 23 wherein each of said space modules further comprises means coupled to said first storage system and said second storage system for cryogenically cooling said first propellant and said second propellant.

31. A propellant supply architecture as in claim 23 wherein, for each of said space modules, said outer structure comprises:
a skeletal frame; and
a skin coupled to and covering said skeletal frame, said skin including means for deflecting space debris impacting said skin.

32. A propellant supply architecture as in claim 31 wherein said skeletal frame comprises:

a plurality of rings spaced apart from one another along a longitudinal axis of said outer structure, said plurality of rings including i) a first ring to which said first docking mechanism is coupled, ii) a second ring to which said second docking mechanism is coupled, and iii) at least one additional ring positioned between said first ring and said second ring; and a plurality of longerons coupled between and to each pair of adjacent ones of said plurality of rings.

33. A method of providing propellant for in-space transportation, comprising the steps of:

providing at least two space modules with each of said space modules comprising
  i) an outer structure,
  ii) a first docking mechanism positioned at a first longitudinal end of said outer structure,
  iii) a second docking mechanism positioned at a second longitudinal end of said outer structure,
  iv) a first storage system mounted within said outer structure for storing a first propellant that burns as a result of a chemical reaction therein,
  v) a second storage system mounted within said outer structure for storing a second propellant that burns as a result of electrical energy being added thereto, and
  vi) a bi-directional transfer interface coupled to said first storage system for transferring said first propellant into and out thereof, said bi-directional transfer interface further coupled to said second storage system for transferring said second propellant into and out thereof, said bi-directional transfer interface terminating at one of said first and second docking mechanisms wherein, when a space vehicle is coupled to said one of said first and second docking mechanisms, each of said first propellant and said second propellant can be transferred to and from the space vehicle via said bi-directional transfer interface;

transporting each of said space modules to an orbit in space;

deploying each of said space modules in the orbit;

coupling a first of said space modules to a first space vehicle via said one of said first and second docking mechanisms associated with said first of said space modules;

propelling said first space vehicle toward a destination in space using said first propellant to generate thrust;

coupling a second of said space modules to a second space vehicle via said one of said first and second docking mechanisms associated with said second of said space modules;

propelling said second space vehicle toward said destination in space using said second propellant to generate thrust;

switching, at approximately said destination, said first space vehicle with said second space vehicle, wherein said first space vehicle is coupled to said second of said space modules and wherein said second space vehicle is coupled to said first of said space modules;

propelling said first space vehicle toward a second destination in space using said first propellant in said second of said space modules to generate thrust; and propelling said second space vehicle toward said second destination in space using said second propellant in said first of said space modules to generate thrust.

34. A method according to claim 33 wherein said second destination is the orbit where said first and said second of said space modules were deployed.

35. A method according to claim 33 wherein, for each of said space modules, each of said first propellant and said second propellant are stored in a liquid form.

36. A method according to claim 35 further comprising the step of cryogenically cooling said first propellant and said second propellant stored in said liquid form.

* * * * *